(12) United States Patent
Ofek et al.

(10) Patent No.: US 12,730,522 B2
(45) Date of Patent: Sep. 8, 2026

(54) SEMANTIC USER INPUT

(71) Applicant: Microsoft Technology Licensing, LLC, Redmond, WA (US)

(72) Inventors: Eyal Ofek, Redmond, WA (US); Michel Pahud, Kirkland, WA (US); Edward Sean Lloyd Rintel, Cambridge (GB); Mar Gonzalez Franco, Seattle, WA (US); Payod Panda, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/677,623

(22) Filed: Feb. 22, 2022

(65) Prior Publication Data

US 2023/0266830 A1 Aug. 24, 2023

(51) Int. Cl.

*G06F 3/0346* (2013.01)
*G06N 5/022* (2023.01)
*G06F 3/01* (2006.01)

(52) U.S. Cl.

CPC .......... *G06F 3/0346* (2013.01); *G06N 5/022* (2013.01); *G06F 3/013* (2013.01)

(58) Field of Classification Search

CPC .......... G06F 3/0346; G06F 3/013; G06F 3/03; G06N 5/022

See application file for complete search history.

(56) References Cited

U.S. PATENT DOCUMENTS 9,002,416 B2 * 4/2015 Alameh ................ G06F 1/1626 455/575.1
11,489,944 B2 * 11/2022 Huang .................... H04L 67/06
(Continued)

FOREIGN PATENT DOCUMENTS

WO WO-2022008070 A1 * 1/2022 ............ G06F 3/017

OTHER PUBLICATIONS

"International Search Report and Written Opinion Issued in PCT Application No. PCT/US2023/011086", Mailed Date: Apr. 5, 2023, 16 Pages.

(Continued)

*Primary Examiner* — Chanh D Nguyen
*Assistant Examiner* — Jarurat Suteerawongsa
(74) *Attorney, Agent, or Firm* — Alleman Hall LLP

(57) ABSTRACT

Aspects of the present disclosure relate to semantic user input for a computing device. In examples, user input is identified and processed to identify and automatically perform an associated semantic action. The semantic action may be determined based at least in part on an environmental context associated with the user input. Thus, an action determined for a given user input may change according to the environmental context in which the input was received. For example, an association between user input, an environmental context, and an action may be used to affect the behavior of a computing device as a result of identifying the user input in a scenario that has the environmental context. Such associations may be dynamically determined as a result of user interactions associated with manually provided input, for example to create, update, and/or remove semantic actions associated with a variety of user inputs.

20 Claims, 10 Drawing Sheets

(56) References Cited

U.S. PATENT DOCUMENTS

| | | | | |
|---|---|---|---|---|
| 2013/0159939 | A1* | 6/2013 | Krishnamurthi | G06F 3/0304 715/863 |
| 2013/0336628 | A1* | 12/2013 | Lamb | G11B 27/105 386/224 |
| 2014/0152538 | A1* | 6/2014 | Ham | G06F 3/038 345/156 |
| 2015/0234477 | A1 | 8/2015 | Abovitz et al. | |
| 2016/0124579 | A1* | 5/2016 | Tokutake | G06F 3/0481 345/156 |
| 2016/0198499 | A1* | 7/2016 | Lee | H04W 4/026 455/450 |
| 2016/0224036 | A1* | 8/2016 | Baker | H04W 4/02 |
| 2016/0378861 | A1 | 12/2016 | Eledath et al. | |
| 2018/0043246 | A1* | 2/2018 | Chang | A63F 13/213 |
| 2019/0324527 | A1 | 10/2019 | Presant et al. | |
| 2019/0355346 | A1* | 11/2019 | Bellegarda | G06F 40/216 |
| 2020/0042089 | A1* | 2/2020 | Ang | G06F 3/016 |
| 2020/0356221 | A1* | 11/2020 | Behzadi | H04L 67/04 |
| 2021/0005012 | A1 | 1/2021 | Gorur Sheshagiri et al. | |
| 2023/0266831 | A1* | 8/2023 | Pehrsson | G06F 3/048 345/173 |

OTHER PUBLICATIONS

Kendon, Adam, "Gesture: Visible action as utterance", In Publication of Cambridge University Press, Sep. 23, 2004, pp. 72-77.

Weller, Susie, "Using internet video calls in qualitative (longitudinal) interviews: some implications for rapport", In International Journal of Social Research Methodology vol. 20, Issue 6, Jan. 16, 2017, pp. 613-625.

Sweller, J., "Human cognitive architecture: Why some instructional procedures work and others do not", In APA Educational Psychology Handbook, vol. 1, Theories, constructs, and critical issues, 2012, pp. 295-325.

Weiser, et al., "The Coming Age of Calm Technology", In Beyond Calculation, Jan. 1997, pp. 75-85.

Carlsson, Britta, "Depicting Experiences", In Scandinavian Journal of Educational Research, vol. 45, Issue 2, Jun. 2001, pp. 125-143.

"Application as Filed in U.S. Appl. No. 17/333,582", filed May 28, 2021, 48 Pages.

Zhang, et al., "Light Weight Background Blurring for Video Conferencing Applications", In Proceedings of International Conference on Image Processing, Oct. 8, 2006, 4 Pages.

Wiberg, et al., "Materiality Matters-Experience Materials", In Journal of Interactions, vol. 20, Issue 2, Mar. 2013, pp. 54-57.

Manabe, et al., "Tap Control for Headphones without Sensors", In Proceedings of the 24th Annual ACM Symposium on user Interface Software and Technology, Oct. 16, 2011, pp. 309-313.

Marquardt, et al., "Cross-Device Interaction via Micro-Mobility and F-Formations", In Proceedings of the 25th annual ACM Symposium on user Interface Software and Technology, Oct. 7, 2012, pp. 13-22.

Marquardt, et al., "The Proximity Toolkit: Prototyping Proxemic Interactions in Ubiquitous Computing Ecologies", In Proceedings of the 24th Annual ACM Symposium on user Interface Software and Technology, Oct. 16, 2011, pp. 315-325.

Matthews, et al., "Defining, Designing and Evaluating Peripheral Displays: An Analysis using Activity Theory", In Journal of Human-Computer Interaction, May 17, 2007, 16 Pages.

Mccurdy, et al., "Breaking the Fidelity Barrier: An Examination of our Current Characterization of Prototypes and an Example of a Mixed-Fidelity Success", In Proceedings of the SIGCHI conference on Human Factors in Computing Systems, Apr. 22, 2006, pp. 1233-1242.

Mehta, et al., "FakeBuster: A DeepFakes Detection Tool for Video Conferencing Scenarios", In Repository of arXiv:2101.03321, Jan. 9, 2021, 5 Pages.

Metzger, et al., "FreeDigiter: A Contact-free Device for Gesture Control", In Proceedings of 8th International Symposium on Wearable Computers, Oct. 31, 2004, 4 Pages.

Molinsky, et al., "Cracking the Nonverbal Code: Intercultural Competence and Gesture Recognition Across Cultures", In Journal of Cross-Cultural Psychology vol. 36, Issue 3, May 1, 2005, pp. 380-395.

Neustaedter, et al., "Blur Filtration Fails to Preserve Privacy for Home-Based Video Conferencing", In Journal of ACM Transactions on Computer-Human Interaction, vol. 13, Issue 1, Mar. 2006, pp. 1-36.

Neustaedter, et al., "Mobile Video Conferencing for Sharing Outdoor Leisure Activities Over Distance", In Journal of Human-Computer Interaction vol. 35, Issue 2, Mar. 3, 2020, pp. 1-31.

Oh, et al., "Let the Avatar Brighten your Smile: Effects of Enhancing Facial Expressions in Virtual Environments", In Journal of PLOS ONE , vol. 11, Issue 9, Sep. 7, 2016, pp. 1-18.

Olwal, et al., "I/O Braid: Scalable Touch-Sensitive Lighted Cords Using Spiraling, Repeating Sensing Textiles and Fiber Optics", In Proceedings of the 31st Annual ACM Symposium on user Interface Software and Technology, Oct. 14, 2018, pp. 485-497.

Oulasvirta, Antti, "Finding Meaningful Uses for Context-Aware Technologies: The Humanistic Research Strategy", In Proceedings of the SIGCHI conference on Human factors in computing systems, Apr. 25, 2004, pp. 247-254.

Pousman, et al., "A Taxonomy of Ambient Information Systems: Four Patterns of Design", In Proceedings of the Workshop on Advanced Visual Interfaces, vol. 2006, May 23, 2006, pp. 67-74.

Ramos, et al., "Pressure Widgets", In Proceedings of the SIGCHI Conference on Human Factors in Computing and Systems, vol. 6, Issue 1, Apr. 24, 2004, 8 Pages.

Saatçi, et al., "Hybrid Meetings in the Modern Workplace: Stories of Success and Failure", In International Conference on Collaboration and Technology, Sep. 4, 2019, pp. 45-61.

Sandler, et al., "Mobilenetv2: Inverted Residuals and Linear Bottlenecks", In Proceedings of the IEEE Conference on Computer Vision and Pattern Recognition, Jun. 18, 2018, pp. 4510-4520.

Santosa, et al., "A Field Study of Multi-Device Workflows in Distributed Workspaces", In Proceedings of the ACM International Joint Conference on Pervasive and Ubiquitous Computing, Sep. 8, 2013, pp. 63-72.

Sauro, Jeff, "10 Things To Know About The Single Ease Question (SEQ)", Retrieved from: https://measuringu.com/seq10/, Oct. 30, 2012, 8 Pages.

Sauro, et al., "Comparison of Three One-Question, Post-Task Usability Questionnaires", In Proceedings of the SIGCHI Conference on Human Factors in Computing Systems, Apr. 8, 2009, pp. 1599-1608.

Schoessler, et al., "Cord UIs: Controlling Devices with Augmented Cables", In Proceedings of the Ninth International Conference on Tangible, Embedded, and Embodied Interaction, Jan. 15, 2015, pp. 395-398.

Seuren, "Whose turn is it anyway? Latency and the organization of turn-taking in video-mediated interaction", In Journal of Pragmatics, vol. 172, Jan. 2021, pp. 63-78.

Song, et al., "Grips and Gestures on a Multi-Touch Pen", In Proceedings of the SIGCHI Conference on Human Factors in Computing Systems, May 7, 2011, pp. 1323-1332.

Sun, et al., "Enhancing Naturalness of Pen-and-Tablet Drawing through Context Sensing", In Proceedings of the ACM International Conference on Interactive Tabletops and Surfaces,, Nov. 13, 2011, pp. 83-86.

Weiser, Mark, "The Computer for the 21st Century", In Journal of Scientific American, vol. 265, Issue 3, Sep. 1991, pp. 94-105.

Syrdal, et al., "Video Prototyping in Human-Robot Interaction: Results from a Qualitative Study", In Proceedings of the 15th European Conference on Cognitive Ergonomics: The Ergonomics of Cool Interaction, Jan. 16, 2008, 8 Pages.

Tian, et al., "Tilt Menu: Using the 3D Orientation Information of Pen Devices to Extend the Selection Capability of Pen-based User Interfaces", In Proceedings of the SIGCHI conference on Human Factors in Computing Systems, Apr. 5, 2008, pp. 1371-1380.

W, Daniel, "Arduino + Unity communication made easy", Retrieved from: https://github.com/dwilches, Apr. 19, 2017, 8 Pages.

(56) References Cited

OTHER PUBLICATIONS

Weigel, et al., "DeformWear: Deformation Input on Tiny Wearable Devices", In Proceedings of the ACM on Interactive, Mobile, Wearable and Ubiquitous Technologies, vol. 1, Issue 2, Jun. 30, 2017, 23 Pages.
Zolyomi, et al., "Managing Stress: The Needs of Autistic Adults in Video Calling", In Proceedings of the ACM on Human-Computer Interaction, vol. 3, Issue CSCW, Article No. 134, Nov. 2019, pp. 1-29.
Kendon, Adam, "Gesture: Visible action as utterance", In Publication of Cambridge University Press, Sep. 23, 2004.
Sweller, J., "Human cognitive architecture: Why some instructional procedures work and others do not", In APA Educational Psychology Handbook, vol. 1, Theories, constructs, and critical issues, 2012.
Weiser, et al., "The Coming Age of Calm Technology", In Beyond Calculation, Jan. 1997.
Carlsson, Britta, "Depicting Experiences", In Scandinavian Journal of Educational Research, vol. 45, Issue 2, Jun. 2001.
Blumer, Herbert, "What is wrong with social theory?", In Journal of American sociological review, vol. 19, Issue 1, Feb. 1954.
"Apple introduces AirPods Max, the magic of AirPods in a stunning over-ear design", Retrieved From: https://www.apple.com/ng/newsroom/2020/12/apple-introduces-airpods-max-the-magic-of-airpods-in-a-stunning-over-ear-design/, Dec. 8, 2020, pp. 1-9.
"Intel® RealSense™ LiDAR Camera L515", Retrieved from: https://web.archive.org/web/20211227124037/https://www.intelrealsense.com/lidar-camera-1515/, Dec. 27, 2021, 6 pages.
Abe, et al., "Hotaru: The Lightning Bug Game", In Proceedings of the CHI Conference Extended Abstracts on Human Factors in Computing Systems, May 7, 2016, pp. 277-280.
Bakker, et al., "Exploring Peripheral Interaction Design for Primary School Teachers", In Proceedings of the Sixth International Conference on Tangible, Embedded and Embodied Interaction, Feb. 19, 2012, pp. 245-252.
Bakker, et al., "Peripheral Interaction: Characteristics and Considerations", In Journal of Personal and Ubiquitous Computing, vol. 19, Issue 1, May 2015, 26 Pages.
Bakker, et al., "Peripheral interaction: Shaping the Research and Design Space", In Proceedings of Extended Abstracts on Human Factors in Computing Systems, Apr. 26, 2014, pp. 99-102.
Ballendat, et al., "Proxemic Interaction: Designing for a Proximity and Orientation-Aware Environment", In Proceedings of the ACM International Conference on Interactive Tabletops and Surfaces, Nov. 7, 2010, 10 Pages.
Bi, et al., "An Exploration of Pen Rolling for Pen-Based Interaction", In the Proceedings of the 21st Annual ACM Symposium on User Interface Software and Technology, Oct. 19, 2008, 10 Pages.
Manabe, et al., "Headphone Taps: A Simple Technique to Add Input Function to Regular Headphones", In Proceedings of the 14th International Conference on Human-computer Interaction with Mobile Devices and Services, Sep. 21, 2012, pp. 177-180.
Boker, et al., "Effects of damping head movement and facial expression in dyadic conversation using real-time facial expression tracking and synthesized avatars", In Journal of Philosophical Transactions of the Royal Society B: Biological Sciences vol. 364, Issue1535, Dec. 12, 2009, pp. 3485-3495.
Braun, et al., "Using Thematic Analysis in Psychology", In Journal of Qualitative Research in Psychology, vol. 3, Issue 2, Jan. 1, 2006, pp. 77-101.
Brubaker, et al., "Focusing on Shared Experiences: Moving beyond the Camera in Video Communication", In Proceedings of the Designing Interactive Systems Conference, Jun. 11, 2012, pp. 96-105.
Brudy, et al., "Cross-Device Taxonomy: Survey, Opportunities and Challenges of Interactions Spanning Across Multiple Devices", In Proceedings of the CHI Conference on Human Factors in Computing Systems, May 4, 2019, pp. 1-28.
Buil, et al., "Headphones with Touch Control", In Proceedings of the 7th Conference on Human-Computer Interaction with Mobile Devices and Services, Sep. 19, 2005, pp. 377-378.
Buxton, William, "Integrating the Periphery and Context: A New Taxonomy of Telematics", In Proceedings of Graphics Interface, vol. 95, Apr. 1, 1995, 8 Pages.
Luff, et al., "Fractured ecologies: creating environments for collaboration", In Human-Computer Interaction, vol. 18, Issue 1, Jun. 2003, 45 Pages.
Caroline, Wang, "Using Photovoice as a Participatory Assessment and Issue Selection Tool", In Community based Participatory Research for Health, 2003, pp. 179-186.
Castelli, et al., "Why students do not turn on their video cameras during online classes and an equitable and inclusive plan to encourage them to do so", In Journal of Ecology and Evolution, Jan. 10, 2021, pp. 3565-3576.
Chen, et al., "Duet: Exploring Joint Interactions on a Smart Phone and a Smart Watch", In Proceedings of the SIGCHI Conference on Human Factors in Computing Systems, Apr. 26, 2014, pp. 159-168.
Chen, et al., "Exploring User Defined Gestures for Ear-Based Interactions", In Proceedings of the ACM on Human-Computer Interaction, vol. 4, Nov. 2020, 20 Pages.
Dagan, et al., "Design Framework for Social Wearables", In Proceedings of the 2019 on Designing Interactive Systems Conference, Jun. 23, 2019, pp. 1001-1015.
Devendorf, et al., "I don't Want to Wear a Screen" Probing Perceptions of and Possibilities for Dynamic Displays on Clothing, In Proceedings of the CHI Conference on Human Factors in Computing Systems, May 7, 2016, pp. 6028-6039.
Dhillon, et al., "Visual Fidelity of Video Prototypes and user Feedback: A Case Study", In Proceedings of HCI The 25th BCS Conference on Human Computer Interaction, Jul. 25, 2011, pp. 139-144.
Dierk, et al., "Hairio: Human Hair as Interactive Material", In Proceedings of the Twelfth International Conference on Tangible, Embedded, and Embodied Interaction, Mar. 18, 2018, pp. 148-157.
Dragan, et al., "Legibility and Predictability of Robot Motion", In Proceedings of 8th ACM/IEEE International Conference on Human-Robot Interaction, Mar. 3, 2013, 8 Pages.
Erickson, et al., "Social Translucence: An Approach to Designing Systems that Support Social Processes", In Journal of ACM Transactions on Computer-Human Interaction, vol. 7, Issue 1, Mar. 2000, pp. 59-83.
Fernaeus, et al., "The Material Move How Materials Matter in Interaction Design Research", In Proceedings of the Designing Interactive Systems Conference, Jun. 11, 2012, pp. 486-495.
Gesslein, et al., "Pen-based Interaction with Spreadsheets in Mobile Virtual Reality", In Proceedings of IEEE International Symposium on Mixed and Augmented Reality, Nov. 9, 2020, 13 Pages.
Greenberg, et al., "Proxemic Interactions: The New Ubicomp?", In Journal of Magazine Interactions, vol. 18, Issue 1, Jan. 1, 2011, 11 Pages.
Greenfield, Adam, "Everyware: The Dawning Age of Ubiquitous Computing", In Publications of New Riders, Mar. 10, 2010, 10 Pages.
Grudin, Jonathan, "Partitioning Digital Worlds: Focal and Peripheral Awareness in Multiple Monitor Use", In Proceedings of the SIGCHI Conference on Human Factors in Computing Systems, Mar. 31, 2001, pp. 458-465.
Hall, Edward T., "The Hidden Dimension", In Publications of Doubleday, 1966, 39 Pages.
Hamilton, et al., "Conductor: Enabling and Understanding Cross-Device Interaction", In Proceedings of the SIGCHI conference on Human factors in computing Privileged and Confidential systems, Apr. 26, 2014, pp. 2773-2882.
Harper, Douglas, "Talking about pictures: A case for photo elicitation", In Journal of Visual Studies, vol. 17, Issue 1, Jan. 1, 2002, pp. 13-26.
Hashimoto, et al., "Study on Natural Head Motion in Waiting State with Receptionist Robot SAYA that has Human-like Appearance", In Proceedings of the 2009 IEEE Workshop on Robotic Intelligence in Informationally Structured Space, Mar. 31, 2009, 6 Pages.

(56) References Cited

OTHER PUBLICATIONS

Heijboer, et al., "Facilitating peripheral interaction: design and evaluation of peripheral interaction for a gesture-based lighting control with multimodal feedback", In Journal of Personal and Ubiquitous Computing, vol. 20, Issue 1, Feb. 2016, 22 Pages.
Hinckley, et al., "Foreground and Background Interaction with Sensor-Enhanced Mobile Devices", In Journal of ACM Transactions on Computer-Human Interaction, vol. 12, Issue 1, Mar. 2005, pp. 31-52.
Hollan, et al., "Distributed Cognition: Toward a New Foundation for Human-Computer Interaction Research", In Journal of ACM Transactions on Computer-Human Interaction, vol. 7, Issue 2, Jun. 2000, pp. 174-196.
Horvitz, Eric, "Principles of Mixed-Initiative User Interfaces", In Proceedings of the SIGCHI Conference on Human Factors in Computing Systems, May 15, 1999, pp. 159-166.
Ju, et al., "The Design of Implicit Interactions: Making Interactive Systems Less Obnoxious", In Journal of Design Issues, vol. 24, Issue 3, Jul. 2008, pp. 72-84.
Jung, et al., "Digital Form and Materiality: Propositions for a New Approach to Interaction Design Research", In Proceedings of the 7th Nordic Conference on Human-Computer Interaction: Making Sense through Design, Oct. 14, 2012, pp. 645-654.
Jung, et al., "Material Probe: Exploring Materiality of Digital Artifacts", In Proceedings of the Fifth International Conference on Tangible, Embedded, and Embodied Interaction, Jan. 22, 2010, pp. 153-156.
Junuzovic, et al., "To See or Not to See: A Study Comparing Four-way Avatar, Video, and Audio Conferencing for Work", In Proceedings of the International Conference on Support Group Work, Oct. 27, 2012, pp. 31-34.
Lissermann, et al., "EarPut: Augmenting Ear-worn Devices for Ear-based Interaction", In Proceedings of the 26th Australian Computer-Human Interaction Conference, Dec. 2, 2014, pp. 300-307.
Kendon, Adam, "Some uses of the head shake", In Journal of Gesture, vol. 2, Issue 2, Dec. 2002, pp. 147-182.
Kikuchi, et al., "EarTouch: Turning the Ear into an Input Surface", In Proceedings of the 19th International Conference on Human-Computer Interaction with Mobile Devices and Services, Sep. 4, 2017, 6 Pages.
Klemmer, et al., "How Bodies Matter: Five Themes for Interaction Design", In Proceedings of the Designing Interactive Systems, Jun. 2006, pp. 140-149.
Kuno, et al., "Combining Observations of Intentional and Unintentional Behaviors for Human-Computer Interaction", In Proceedings of the SIGCHI Conference on Human Factors in Computing Systems, May 15, 1999, pp. 238-245.
Li, et al., "Kissglass: Greeting Gesture Recognition using Smart Glasses", In Proceedings of the Augmented Humans International Conference, Mar. 16, 2020, 5 Pages.
Lin, et al., "Manipulation of Remote 3D Avatar through Facial Feature Detection and Real Time Tracking", In IEEE International Conference on Multimedia and Expo, Aug. 1, 2001, pp. 1064-1067.
First Examination Report Received for Indian Application No. 202417062439, mailed on Dec. 16, 2025, 8 pages.
Communication pursuant to Article 94(3) EPC received for European Application No. 23705781.5, mailed on Mar. 31, 2026, 6 pages.

* cited by examiner

SEMANTIC USER INPUT

BACKGROUND

A user may control a computing device using a variety of user input. However, user input associated with performing a given action using the computing device may be counter-intuitive and may therefore be difficult for the user to learn, remember, and/or perform, thereby leading to decreased productivity and increased user frustration, among other detriments.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to semantic user input for a device. In examples, user input is identified and processed to identify and automatically perform an associated semantic action based on the identified user input. The semantic action may be determined based at least in part on an environmental context associated with the user input. Thus, an action determined for a given user input may change according to the environmental context in which the input was received. For example, an association between user input, an environmental context, and an action may be used to affect the behavior of a computing device as a result of identifying the user input in a scenario that has the environmental context. Such associations may be dynamically determined as a result of user interactions associated with manually provided input, for example to create, update, and/or remove semantic actions associated with a variety of user inputs.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
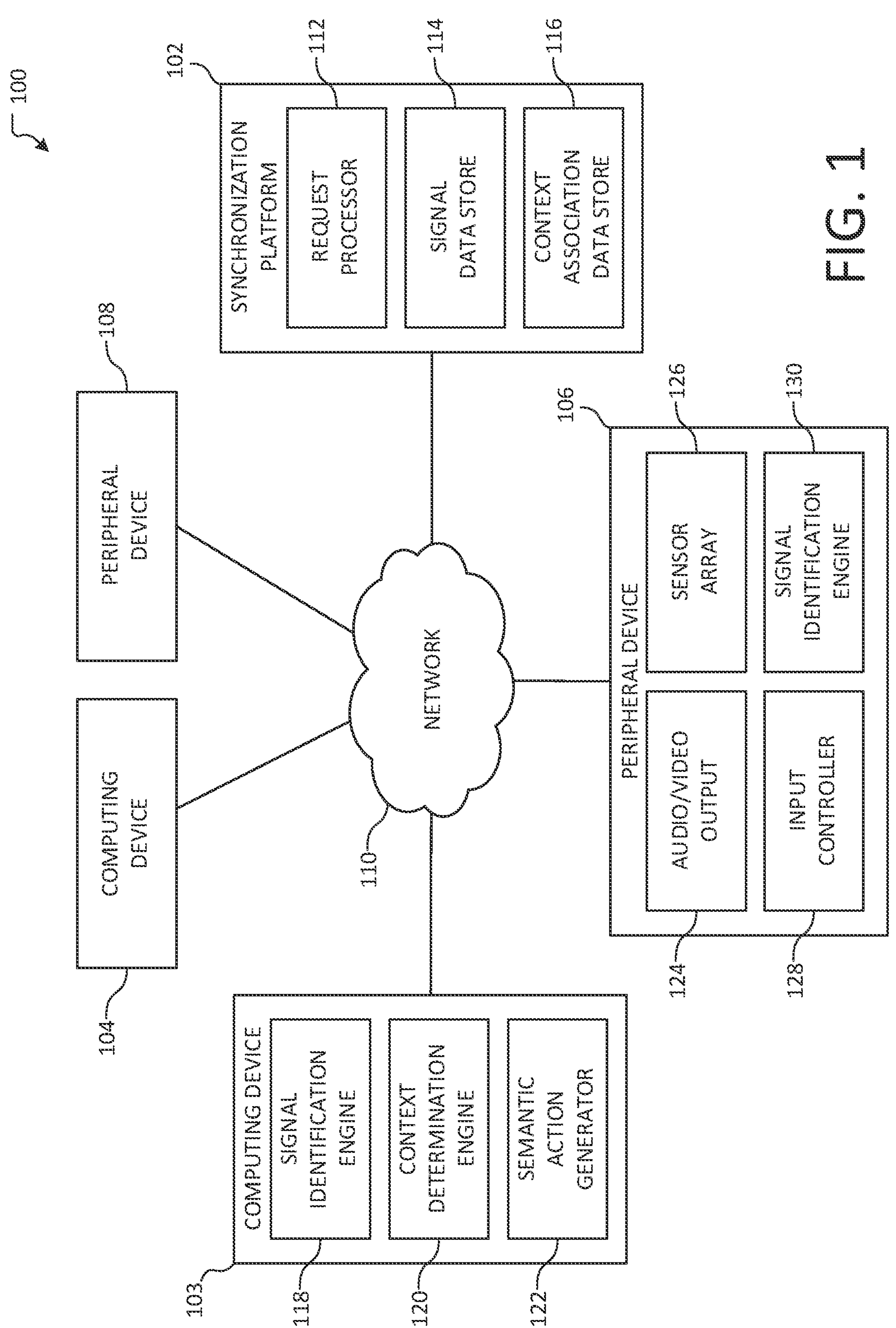
FIG. 1 illustrates an overview of an example system for semantic user input according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a user may use one or more controls to provide user input to a computing device, thereby causing the computing device to perform one or more actions. For example, the user may actuate one or more hardware and/or software controls of the computing device or of an associated peripheral device. Example controls include, but are not limited to, mouse input, keyboard input, touch screen input, or input received via any of a variety of other buttons or sensors of the computing device or the peripheral device. Thus, it will be appreciated that a control may be a hardware control and/or a software control, among other examples.

However, an action of the computing device that is associated with a control may not be intuitive, such that it may take time for the user to become familiar with operation of the computing device. As another example, the user may rarely perform an action, such that it may be difficult for the user to remember how to invoke the action. In some instances, providing the requisite input to perform an action may be tedious, as may be the case when multiple steps or inputs are associated with invoking an action. These and other difficulties may negatively affect the user experience of a computing device and associated software, which may result in user frustration, the inadvertent introduction of human error, and decreased user efficiency, among other detriments.

Accordingly, aspects of the present disclosure relate to semantic user input for a computing device. In examples, user input is identified and processed according to aspects described herein to perform an associated semantic action based on the identified user input. The semantic action may be determined based at least in part on an environmental context, such that an action determined for a given user input may change according to the environmental context for which it was received. For example, an association between user input, an environmental context, and an action may be used to affect the behavior of a computing device as a result of identifying the user input in a scenario that has the environmental context. Such an association may be referred to herein as a "semantic association."

User input may be explicit input (e.g., a user actuating a button of the computing device or using a peripheral device to provide user input to the computing device) and/or implicit input (e.g., as may be detected as a user interacts with and responds to the environment). User input may thus be obtained as interaction data from one or more software applications and/or hardware components (e.g., of the computing device and/or associated peripheral devices), including, but not limited to, one or more buttons, capacitive sensors, touch screens, proximity sensors, light detection and ranging (LIDAR) sensors, image sensors (e.g., capturing visible and/or infrared (IR) light), and inertial measurement unit (IMU) sensors. It will be appreciated that obtained user input may vary according to a user's mood, associated physiological characteristics, and/or the time of day, among other factors. For example, a gesture of a user may have a greater amplitude and/or speed during the day as compared to late at night. Thus, such factors and associated differences may be used when processing interaction data according to aspects described herein. As discussed in greater detail below, interaction data may be aggregated or otherwise used from any number of devices.

The interaction data may be processed to generate a set of user signals. For example, one or more movements of a device and/or user may be classified using a set of rules, a machine learning model, and/or according to computer vision techniques, among other examples. The set of user signals may further include user explicit interactions with hardware and/or software controls, among other examples.

The set of user signals may be processed based on an environmental context to generate a semantic action accordingly. For example, the environmental context may include a digital context associated with one or more devices (e.g., a set of open applications, an active user account, and/or an active application or application window), a cultural context (e.g., based on a user's locale setting, language setting, and/or time zone), and/or a physical context (e.g., a relative location of a user in relation to a device, a relative location of a peripheral device to another device, an orientation of a device with respect to another device, and/or an orientation of a user with respect to a device or a user). The environmental context may be determined or obtained to process the set of user signals. In some examples, the environmental context may be generated and/or maintained by one or more devices, for example using data and/or sensors of each device to determine the digital context, cultural context, and/or physical context accordingly. The set of devices may communicate with one another, may communicate with a central device (e.g., proximate to the environment or a remote device), or a combination thereof.

As an example, an action performed using an input control of a device (e.g., a pair of headphones or other peripheral device) may change according to an active application, a user's hand pose used to provide the input (e.g., a microphone may be toggled if the user points to his or her mouth, while a light may be toggled if the user points to his or her eye), and/or may affect the device at which the user is gazing. It will further be appreciated that multiple devices may therefore be controlled using a single device (e.g., according to a user's gaze and/or head pose). Additionally, a set of user signals used to identify and ultimately invoke one or more sematic actions may include common and/or easy-to-remember hand poses (e.g., which may be easy to remember and/or easy to perform in an eyes-free manner).

Thus, as compared to fixed, difficult or tedious to learn/remember, and/or potentially counter-intuitive user input methods, aspects of the present disclosure may enable more natural user interactions with a device by virtue of the identification of user signals using various data sources and in view of environmental context information. Further, identified user signals, each of which may have one or more associated environmental contexts, may be used to automatically generate, update, and/or remove semantic actions. As a result, a device may dynamically adapt to different usage styles, input methods, and preferences, as may vary between users, companies, industries, and/or cultures, among other examples.

In examples, a computing device receives interaction data from any of a variety of other devices and processes the interaction data to generate an action according to aspects described herein. As another example, the processing may be performed by a peripheral device (e.g., based on interaction data collected local to the peripheral device and/or using interaction data from one or more other devices), such that the determined action is provided to the computing device accordingly and/or performed by the peripheral device. Thus, it will be appreciated that interaction data may be obtained from any of a variety of sources, environmental context may be maintained by any number of devices, and semantic action processing may be performed at any number of devices according to aspects described herein.

Example peripheral devices include, but are not limited to, a stylus, a computer mouse, a trackpad, a keyboard, a television remote, a video game controller, a virtual reality (VR) or augmented reality (AR) headset, a pair of headphones, or earbuds. Further, the behavior of any of a variety of devices may be adapted according to aspects described herein, including, but not limited to, mobile computing devices, tablet computing devices, desktop computing devices, peripheral computing devices, video game computing devices, and internet-of-things (IoT) computing devices.

As noted above, semantic actions may be created, updated, or removed as a result of user interactions with a device. In some examples, a set of default semantic actions may be used, where a set of user signals and an associated environmental context may cause the default semantic action to be performed. However, a default semantic action may be modified (e.g., to include additional or alternative user signals and/or to be associated with a different or updated environmental context). In other examples, a new semantic action may be generated in addition to or as an alternative to a default semantic action.

These and other changes may occur based on identifying one or more user signals associated with a user manually performing an action, such that an association may be generated between the user signals and the action. As another example, interaction data may be evaluated when a semantic action is performed, such that it may be determined whether the resulting computing device behavior was expected by the user. In instances where the interaction data indicates an unexpected or undesirable result (e.g., as may be determined based on identifying a look of surprise or a user manually undoing or altering the behavior of the computing device in association with the semantic action), such an association may be modified or removed. Additional examples of such aspects are described below.

In examples, semantic associations are maintained on a per-device basis, such that each device may generate, update, and remove semantic associations with which user input is processed to perform one or more semantic actions associated therewith. In other examples, semantic associations may be synchronized for a set of devices, thereby enabling a more consistent user experience across devices. Similarly, this may reduce the amount of configuration associated with setting up a device that is new to the set of devices. As another example, a device may utilize a semantic association that it would otherwise be unable to generate, as may be the case when the device offers limited processing and/or user interaction capabilities. For instance, the device may be unable to generate an environmental context (e.g., as a result of a limited set of available sensors), such that environmental context information may be used from one or more other devices (e.g., in addition to or as an alternative to generating environmental context information at the device).

A semantic association framework may be provided (e.g., by an operating system of a computing device), wherein an application of a computing device may utilize the semantic association framework to map application functionality with semantic actions of the computing device. In such an example, the semantic association framework may maintain a set of semantic associations for a user of the device. Accordingly, identified user signals may invoke application functionality as a result of the mapping between a semantic action and the application functionality. Thus, multiple applications may map semantic actions to respective application functionality without maintaining semantic associations according to aspects described herein. Such aspects may improve user privacy and security, as the applications are not provided access to interaction data with which to generate or otherwise maintain such semantic associations. Even so, the semantic association framework may enable consistent interactions across applications executing on the computing device.

As an example, interaction data may be processed to identify a set of signals associated with a "mute" action of a computing device, thereby muting the microphone of the computing device accordingly. For example, it may be determined that a user's index finger was moved to be positioned in front of the user's mouth (e.g., based on image data and/or LIDAR data), which is a gesture typically associated with requesting that one be quiet or stop talking. As another example, it may be determined that user's gaze is directed elsewhere (e.g., based on computer vision techniques and/or an IMU in a user's headset), for example toward another individual in the user's environment. In some instances, it may be determined that the user is looking at another device. It may be determined, based on a digital context, that the device is not associated with the user's current activity on the computing device, such that the microphone is muted. Alternatively, it may be determined that the device is associated with the user's current activity, such that the microphone may remain active. As another example, a user may look a first direction at an individual, thereby causing the microphone to mute, whereas a gaze in a second direction (e.g., toward a device) may cause the microphone to remain active.

In another instance, an input control of a device may have a different associated semantic action based on its orientation with respect to one or more other devices. For example, a user may point a first device toward a second device, such that the first device controls the second device accordingly. Thus, a semantic action for the first device based on received user input may be determined according to device orientation, among other aspects of an environmental context. Accordingly, when the user reorients the first device to point toward a third device, the first device may instead control the third device. In such an example, semantic actions may be similar for each the second and third devices or may be different, or any combination thereof. As a further example, a user's gaze may additionally or alternatively affect the semantic actions performed by a device in response to user input.

In a further example, a user may orient the device according to his or her body to control one or more devices. For example, a device orientation associated with the user's eyes may be associated with one or more smart lighting devices, a device orientation associated with the user's ears may be associated with a device volume, and a device orientation associated with the user's nose may be associated with a smart thermostat device, among other examples. Such input techniques may be memorable and may improve device usability as a result of the comparative ease with which the user may identify and invoke these relative device positions as compared to navigating potentially tedious menus or conforming to rigid input controls. For example, the user may be able to achieve these and other device orientations with reduced or minimal (re) orientation within the user's environment.

In another instance, a smart light switch device may process received user input according to an environmental context to identify a semantic action accordingly. For example, if it is determined that the user is leaving a room, the switch may turn off one or more smart lighting devices in the room and/or provide a reminder that the user has a set of belongings. Thus, actuation of an input control of the smart light switch device changes according to its environmental context.

Similarly, a video game controller may process interaction data to perform any of a variety of semantic actions. For example, a button of the video game controller may have an associated action when a video game application is active on a computing device, but may perform any of a variety semantic actions with respect to the computing device and/or other devices in scenarios with a different environmental context. As another example, interaction data indicative of a user's movements may be processed to identify user signals associated with semantic actions for controlling the video game application, for example causing a player's character to duck when the set of user signals indicates that the user is ducking or causing the player's character to move in a direction according to a direction identified according to the set of user signals. As noted above, these and other actions may be performed based on sensor data of the video game controller and/or one or more other devices, for example based on an IMU of the user's headset.

As another example, a user may select a set of applications and/or application windows to share during an online meeting. A semantic action may be identified according to the user's gaze, wherein the semantic action causes an application and/or application window that is the subject of the user's gaze to be selected from the set and presented to meeting participants accordingly. As another example, it may be determined that the user's gaze is toward a meeting participant, such that content sharing may be suspended.

FIG. 1 illustrates an overview of an example system 100 for semantic user input according to aspects described herein. As illustrated, system 100 includes synchronization platform 102, extensibility device 104, computing device 103, computing device 104, peripheral device 106, peripheral device 108, and network 110. As illustrated, synchronization platform 102, extensibility device 104, computing device 103, computing device 104, peripheral device 106, and peripheral device 108 communicate via network 110, which may comprise a local area network, a wireless network, or the Internet, or any combination thereof, among other examples.

While system 100 is illustrated in an example where computing devices 103 and 104 may communicate with peripheral devices 106 and 108 via network 110, it will be appreciated that, in other examples, peripheral device 106 and/or 108 may be directly connected to a computing device, for example using a wired (e.g., universal serial bus (USB) or other electrical connection) and/or wireless (e.g., Bluetooth Low Energy (BTLE) or Wi-Fi Direct) connection.

Devices 103-108 may each be any of a variety of devices, including, but not limited to, a mobile computing device, a tablet computing device, a laptop computing device, a desktop computing device, an IoT (or "smart") computing device, or a server computing device, among other examples. For example, computing device 103 may be a mobile computing device, peripheral device 106 may be a VR computing device, computing device 104 may be a desktop computing device, and peripheral device 108 may be a smart lighting device, among other examples.

Synchronization platform 102 includes request processor 112, signal data store 114, and context association data store 116. In examples, synchronization platform 102 synchronizes a set of semantic associations among a set of devices (e.g., computing device 103, computing device 104, peripheral device 106, and/or peripheral device 108). Accordingly, request processor 112 may receive requests from devices 103-108 for synchronization data, including, but not limited to, the set of semantic associations, training data associated with identified user signals and associated semantic actions, and/or environmental context information, among other examples. Such data may be stored by signal data store 114 and context association data store 116.

In examples, synchronization may be performed by one or more of devices 103-108 as an alternative to or in addition to using centralized synchronization (e.g., as may be provided by synchronization platform 102). In an example, the training data may be shared directly between computing devices (e.g., without use of synchronization platform 102) or may be retained only by the device at which it was generated (e.g., computing device 103 or peripheral device 108). As another example, training data associated with a set of users may be aggregated. For instance, training data may be aggregated from computing device associated with a team, an organization, or other group of users.

Computing device 103 is illustrated as comprising signal identification engine 118, context determination engine 120, and semantic action generator 122. In examples, signal identification engine 118 processes interaction data to generate a set of signals according to aspects described herein. For example, signal identification engine 118 may process interaction data obtained from sensors, software, or any of a variety of other sources of computing device 103, computing device 104, peripheral device 106, and/or peripheral device 108. In another example, the environment may further include one or more sensors (not pictured) from which interaction data may be obtained. In some examples, at least a part of the obtained data may have already been processed on the device from which it was received, for example by signal identification engine 130 of peripheral device 106. Signal identification engine 118 may process the interaction data according to any of a variety of techniques, including, but not limited to, using a set of rules, a machine learning model (e.g., trained according to training data local to computing device 103 and/or obtained from synchronization platform 102), and/or according to computer vision techniques. The generated set of user signals may be processed by semantic action generator 122, as discussed below.

Context determination engine 120 may maintain, update, or otherwise determine an environmental context for the environment in which computing device 103 is located. For example, the environment may be a room, a building, or a geographic region having a given radius or other area, among other examples. For instance, one or more of devices 103-108 may be located within the environment for which the environmental context is determined. Similar to signal identification engine 118, context determination engine 120 may generate the environmental context based at least in part on data received from one or more devices 104-108. For example, context determination engine 120 may generate a digital context, cultural context, and/or a physical context. In some instances, at least a part of the data processed by signal identification engine 118 may be processed by context determination engine 120 (or vice versa, in other examples).

Semantic action generator 122 processes a set of signals (e.g., as was generated by signal identification engine 118) and an environmental context (e.g., as may be obtained from context determination engine 120) to perform semantic actions accordingly. For example, semantic action generator 122 may process a set of user signals based on an environmental context to determine a semantic action based on a semantic association. As noted above, a semantic association may associate a semantic action, one or more user signals, and an environmental context, such that the semantic action may be performed as a result of identifying the user signals in a scenario matching the environmental context.

While examples are described in which an association is used to determine a semantic action for a set of user signals based on an environmental context, it will be appreciated that any of a variety of additional or alternative techniques may be used. For example, a set of rules, heuristics, and/or machine learning may be used. In some instances, a set of user signals may have an associated default action, which may be modified or removed based on interaction data. Similarly, new semantic associations may be generated, for example as a result of identifying a set of user signals that are associated with the user manually performing one or more actions.

In some instances, a predetermined threshold may be used to determine whether the set of user signals is likely to be indicative of a user intent to perform the one or more actions. In such an example, when the set of user signals have an occurrence that exceeds the predetermined threshold, a semantic association may be generated between the set of user signals and a semantic action, thereby causing the one or more actions to be automatically performed in response to identification of the set of user signals. A similar analysis may be used for an environmental context, such that similarities of respective environmental contexts may be identified for each instance of a user performing an action. As a result of determining that an environmental context is present in association with the action above a predetermined threshold, the environmental context may similarly be part of a generated semantic association.

It will be appreciated that other techniques may be used in addition to or as an alternative to the above-described threshold-based analysis. For example, reinforcement learning may be used in conjunction with user signals, an environmental context, and resulting user actions, where the reward function is associated with identifying and automatically performing a semantic action accordingly. For example, it may be determined that a semantic function was correctly identified based on determining that a user did not retroactively correct performance of the semantic action or the user did not exhibit frustration or dissatisfaction, among other examples. As another example, a semantic action suggestion may be presented to the user, such that the user may provide input to accept the suggestion. Such user acceptance may similarly be used as annotated training data for reinforcement learning. In a further example, user input may be identified, such that a history of user signals may be evaluated to identify one or more semantic actions to perform.

Thus, as a result of semantic action generator 122 determining a semantic action (e.g., based on a set of user signals from signal identification engine 118 and an environmental context from context determination engine 120), the behavior of computing device 103 may be adapted accordingly, examples of which are described above. For example, an application executing on computing device 103 may be controlled based on the semantic action or computing device functionality may be controlled (e.g., enabling or disabling hardware functionality, launching an application, actuating a user interface element, or performing a set of actions associated with one or more user interface elements). In other examples, an indication of the semantic action may be provided to one or more other computing devices, such as computing device 104, peripheral device 106, and/or peripheral device 108. Further, changes to a set of semantic actions may be propagated to one or more of devices 104-108 (e.g., via synchronization platform 102).

As noted above, a software application may utilize a framework (e.g., as may be provided by an operating system of computing device 103) to associate software application functionality with a determined semantic action. For example, the software application may register a function or other functionality of the application with the framework, such that when it is determined to perform the semantic action, the registered functionality of the software application is invoked (e.g., as a result of determining that the software application is the active application of the computing device or that the software application is the intended target of the semantic action).

Peripheral device 106 is illustrated as comprising audio/video output 124, sensor array 126, input controller 128, and signal identification engine 130. In examples, audio/video output 124 includes one or more speakers and/or displays. Accordingly, data may be received from computing device 103 and used to provide auditory and/or visual output to a user via audio/video output 124. Sensor array 126 includes one or more sensors as described herein and may generate interaction data (e.g., as may be processed by a signal identification engine, such as signal identification engine 118 and/or signal identification engine 130). In examples, signal identification engine 130 processes at least a part of the interaction data from sensor array 126 (and/or software executing on peripheral device 106) to generate a set of user signal, such that the interaction data itself need not leave peripheral device 106. Such aspects may improve user privacy and reduce bandwidth utilization by reducing or eliminating the amount of interaction data that is transmitted by peripheral device 106. As another example, such processing may be performed by a computing device (e.g., computing device 103) to reduce resource utilization by peripheral device 106. Input controller 128 may provide an indication of the interaction data and/or generated set of user signals to a computing device, such as computing device 103.

In some instances, peripheral device 106 may include a semantic action generator, aspects of which were discussed above with respect to semantic action generator 122 of computing device 103. Thus, it will be appreciated that user signals may be used to determine a sematic action at any of a variety of devices. Further, such processing need not be limited to data generated or otherwise obtained by the computing device at which the processing is performed. For example, a semantic action generator of peripheral device 106 may use interaction data from sensor array 126 and/or one or more of devices 103, 104, and/or 106, as well as an environmental context generated by peripheral device 106 or another device (e.g., as may be generated by context determination engine 120). Aspects of computing device 104 and peripheral device 108 are similar to computing device 103 and peripheral device 108, respectively, and are therefore not necessarily re-described below in detail.

In examples, computing device 104 may be a new device to system 100, such that semantic associations, machine learning models, and/or other data may be obtained from synchronization platform 102 (e.g., as may have been generated by one or more other devices of system 100). Accordingly, computing device 104 may process user signals to generate semantic actions as described herein without first adapting a set of semantic actions to a user of computing device 104. For instance, the set of semantic actions may have already been adapted to the user as a result of processing performed by computing device 103, peripheral device 106, and/or peripheral device 108.

Figure 2:
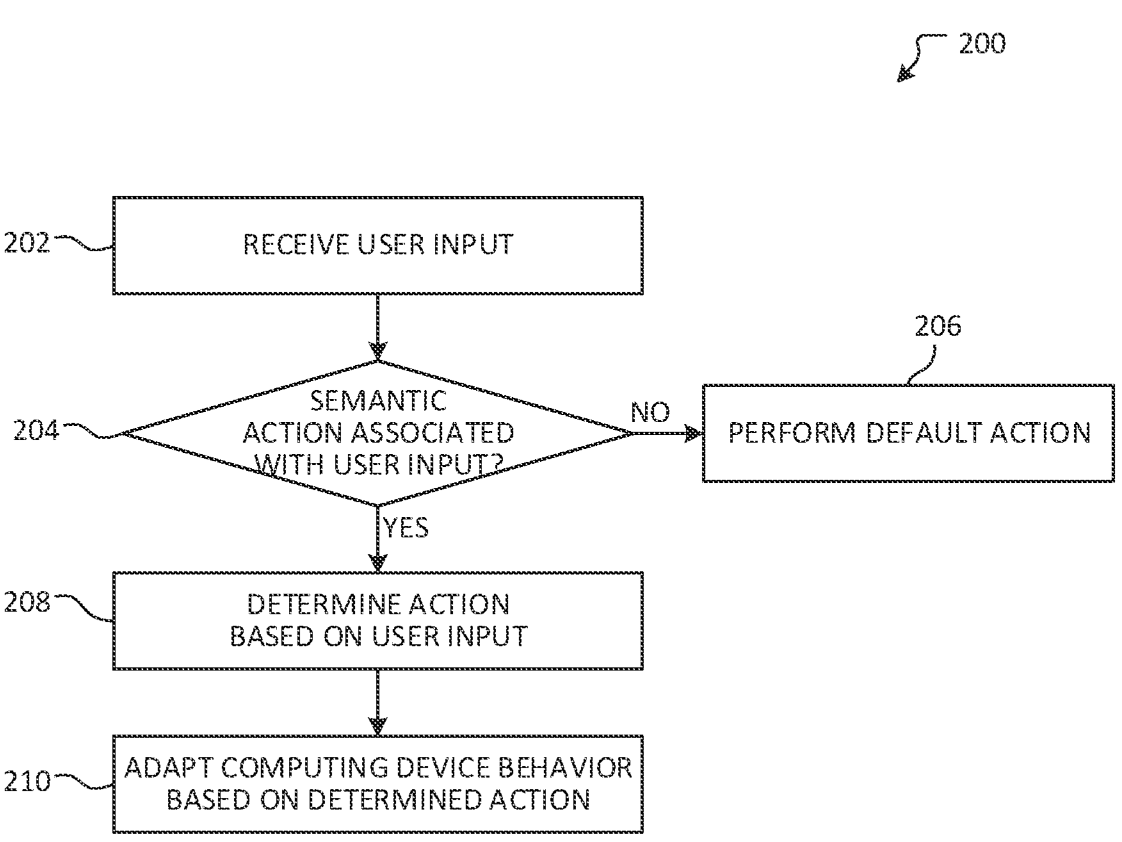
FIG. 2 illustrates an overview of an example method for processing a user input to perform an action to affect computing device behavior.

FIG. 2 illustrates an overview of an example method 200 for processing a user input to perform an action to affect computing device behavior. In examples, aspects of method 200 are performed by a device, such as computing device 103, computing device 104, peripheral device 106, or peripheral device 108 discussed above with respect to FIG. 1.

Method 200 begins at operation 202, where user input is received. For example, the user input may be received via one or more hardware and/or software input controls of a device. In some examples, the user input is received via a sensor array, such as sensor array 126 discussed above with respect to peripheral device 106 in FIG. 1. In examples, the user input is received from a different device than the device at which method 200 is being performed. An example of such aspects were discussed above with respect to peripheral device 106 and computing device 103 in FIG. 1.

At determination 204, it is determined whether there is a semantic action associated with the user input. For example, determination 204 may comprise evaluating the received user input to generate a set of user signals, which may be processed in view of an environmental context for the environment associated with the received user input. Accordingly, the evaluation may identify a semantic action as a result of a semantic association according to aspects described herein. Additional examples of such aspects are discussed below with respect to FIG. 3.

It will be appreciated that method 200 is provided as an example where a semantic action either is or is not identified at determination 204. In other examples, it may be determined to request clarification or disambiguation from a user (e.g., prior to proceeding to either operation 206 or 208), as may be the case when a confidence level associated with determining an action is below a predetermined threshold or when multiple candidate actions are identified, among other examples. In examples where such clarifying user input is received, an indication of the user input may be stored (e.g., in association with a resulting action) and used to improve accuracy when processing future user input.

If it is determined that there is not a semantic action associated with the user input, flow branches "NO" to operation 206, where a default action is performed. For example, the user input may have an associated pre-configured action. In other examples, method 200 may comprise determining whether the user input has an associated default action, such that, in some instances, no action may be performed as a result of the received user input. Method 200 terminates at operation 206.

If, however, it is determined that there is a semantic action associated with the user input, flow instead branches "YES"

to operation 208, where a semantic action is determined based on the user input. For example, a semantic association (e.g., as may have been identified at determination 204) may be used to determine a semantic action associated with the user input that was received at operation 202. In examples, the action determined at operation 208 differs according to an environmental context, as may be obtained from or otherwise generated by a context determination engine, such as context determination engine 120 discussed above with respect to FIG. 1. Additional examples of such aspects are discussed below with respect to FIG. 3.

Flow progresses to operation 210, where the behavior of a computing device is adapted according to the action that was determined at operation 208. For example, the semantic action may be performed by the computing device at which method 200 was performed. In another example, an indication of the semantic action may be provided to another computing device. For example, aspects of method 200 may be performed by a peripheral device, such that operation 210 comprises providing an input to an associated computing device. As another example, operation 210 may comprise using an application programming interface (API) call to affect the behavior of the computing device based on the determined semantic action accordingly. Method 200 terminates at operation 210.

While method 200 is described as an example where a semantic association is used to identify and perform a semantic action, it will be appreciated that any of a variety of additional or alternative techniques (e.g., reinforcement learning or a set of rules, etc.) may be used to determine a semantic action based on a received user input, other examples of which are described above.

Figure 3:
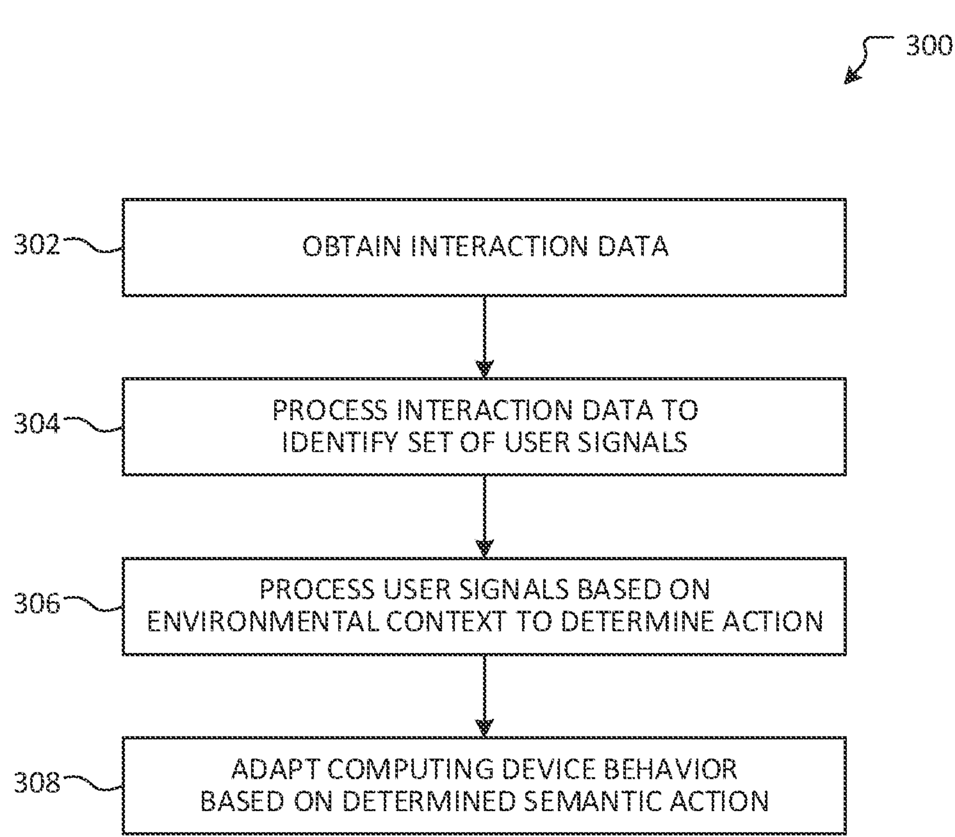
FIG. 3 illustrates an overview of an example method for determining an action based on user signals and environmental context.

FIG. 3 illustrates an overview of an example method 300 for determining an action based on user signals and environmental context. In examples, aspects of method 300 are performed by a semantic action generator, such as semantic action generator 122 discussed above with respect to FIG. 1. For example, method 300 may be performed by a computing device (e.g., computing device 103 or 104), a peripheral device (e.g., peripheral device 106 or 108), or any of a variety of other devices.

Method 300 begins at operation 302, where interaction data is obtained. For example, the interaction data may be indicative of received user input (e.g., as discussed above with respect to operation 202 of method 200 in FIG. 2). The interaction data may be associated with hardware and/or software input of one or more computing devices. In some examples, the interaction data is associated with a sensor array of a computing device. Operation 302 may comprise obtaining the interaction data from one or more local and/or remote sources, for example from the device performing method 300 (e.g., computing device 103) and/or remote devices (e.g., computing device 104, peripheral device 106, and/or peripheral device 108).

Flow progresses to operation 304, where the interaction data is processed to generate a set of user signals. For example, operation 304 may comprise classifying at least a part of the interaction data using a set of rules, a machine learning model, and/or computer vision techniques, among other examples. In some instances, a machine learning model may be specific to a user of the computing device, such that the machine learning model may have been trained (e.g., from user-specific training data and/or using reinforcement learning techniques) to better identify user-specific interactions with the computing device and/or the environment of the user.

At operation 306, the user signals are processed based on an environmental context to determine an associated semantic action. For example, the environmental context may be obtained from or otherwise be generated by a context determination engine, such as context determination engine 120 discussed above with respect to FIG. 1. In examples, the context determination engine may be remote from the device performing aspects of method 200. For example, the device may not have computing resources with which to generate or update an environmental context, such that the environmental context may be obtained from or provided by another device. As described herein, a semantic association may be identified based on the set of user signals and the environment context, thereby identifying a semantic action.

Accordingly, at operation 308, computing device behavior is adapted based on the determined semantic action. Aspects of operation 308 may be similar to those discussed above with respect to operation 210 and are therefore not necessarily re-described in detail. For example, the computing device performing method 300 may be adapted according to the semantic action and/or one or more other devices may be adapted accordingly. Method 300 terminates at operation 308.

Figure 4:
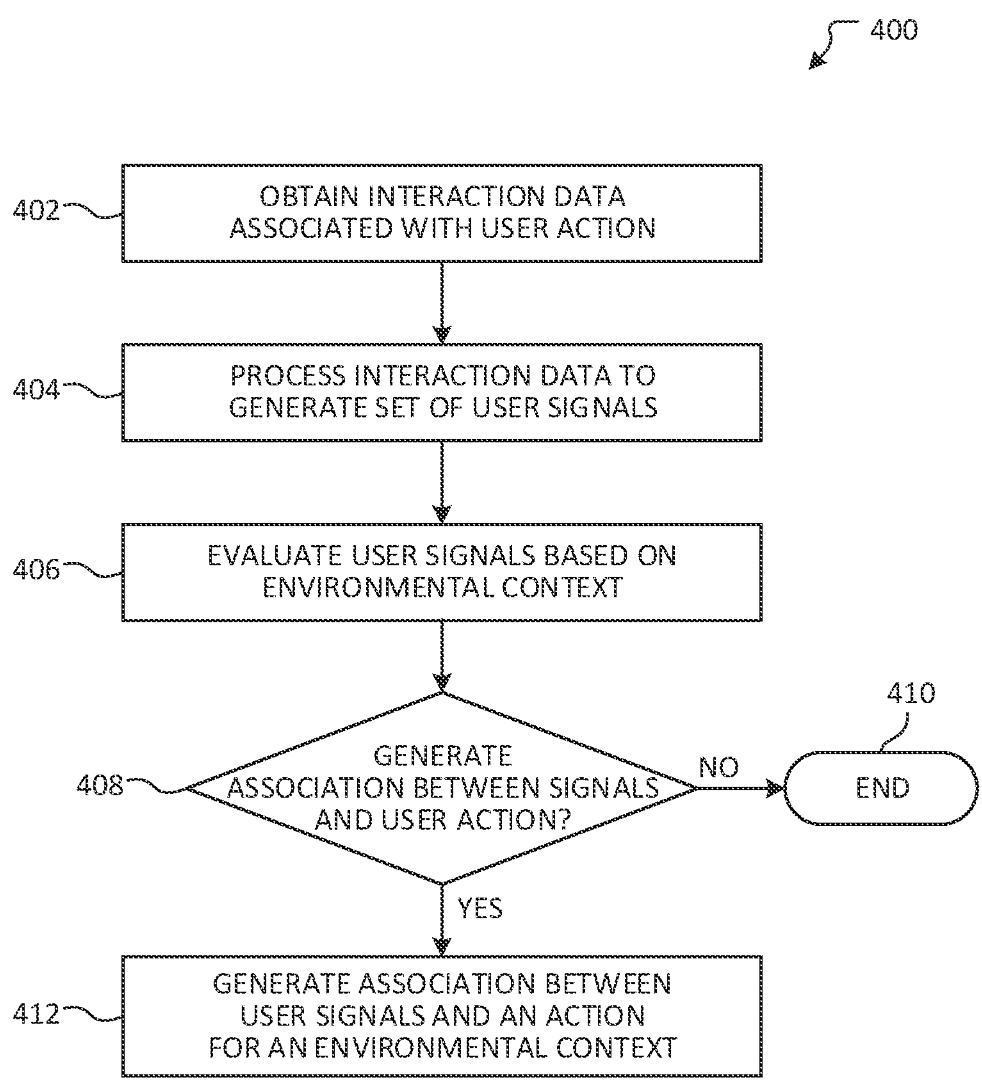
FIG. 4 illustrates an overview of an example method for generating an association between a set of user signals and an action for an environmental context.

FIG. 4 illustrates an overview of an example method 400 for generating an association between a set of user signals and an action for an environmental context. In examples, aspects of method 400 are performed by a semantic action generator, such as semantic action generator 122 discussed above with respect to FIG. 1. For example, method 400 may be performed by a computing device (e.g., computing device 103 or 104), a peripheral device (e.g., peripheral device 106 or 108), or any of a variety of other devices.

Method 400 begins at operation 402, where interaction data associated with a user action is obtained. For example, the interaction data may be obtained from one or more hardware controls, software controls, and/or sensor arrays, among other examples. The interaction data may be associated with a user action, for example based on determining that the interaction data occurred contemporaneously with receipt of the user action. In some instances, a predetermined range of interaction data may be used, for example having a predetermined amount of time before and after receipt of the user interaction. It will be appreciated that any of a variety of techniques may be used to associate interaction data with a user action. Further, aspects of method 400 may be performed contemporaneously or soon after the user action occurs or, as another example, method 400 may be performed later in time, for example using telemetry data associated with the user action. The user action may include explicit and/or implicit user actions performed by the user as described above.

At operation 404, the interaction data is processed to generate a set of user signals. For example, operation 404 may comprise classifying at least a part of the interaction data using a set of rules, a machine learning model, and/or computer vision techniques, among other examples. In some instances, a machine learning model may be specific to a user of the computing device, such that the machine learning model may have been trained (e.g., from user-specific training data and/or using reinforcement learning techniques) to better identify user-specific interactions with the computing device and/or the environment of the user.

Flow progresses to operation 406, where the user signals are evaluated based on an environmental context, as may be obtained from or generated by a context determination engine, such as context determination engine 120 discussed above with respect to FIG. 1. In examples, operation 406 comprises evaluating a frequency with which the set of user signals and/or environmental context occur in relation to a predetermined threshold. In some instances, the predetermined threshold may be an absolute threshold or may be a time-based threshold wherein the frequency is evaluated with respect to a predetermined amount of time.

As another example, operation 406 may comprise evaluating the set of user signals and/or environmental context based on a repository of pre-existing semantic associations, such that it may be determined that a user would utilize a semantic association of the repository. For example, the repository may include crowd-sourced, shared, or otherwise aggregated semantic associations, which may enable a device to implement a semantic association more quickly than would otherwise be possible if the semantic association was automatically generated based on evaluating user signals and an associated environmental context. In a further example, a similar semantic association may be identified, such that the semantic association may be used as a template with which to process a specific set of user signals and/or a specific environmental context. Thus, it will be appreciated that any of a variety of evaluations may be performed when determining to generate a semantic association according to aspects described herein.

At determination 408, it is determined whether to generate a semantic association between the set of user signals and the user action with which the interaction data obtained at operation 402 is associated. The determination may be based on the evaluation performed at operation 406, for example evaluating a frequency as compared to a predetermined threshold or determining whether a relevant pre-existing semantic association exists in a repository, among other examples. As used here, a relevant semantic association may have a substantially similar set of user signals, a substantially similar environmental context, and/or a substantially similar action. If it is determined not to generate an association, flow branches "NO" and terminates at operation 410.

However, if it is determined to generate a semantic association, flow instead branches "YES" to operation 412, where a semantic association is generated between the set of user signals and a semantic action for the environmental context. For example, the semantic association may be associated with a semantic action that is representative of the user action. As discussed above, the semantic action may include one or more API calls, affecting the behavior of a device and/or software executing thereon, actuating one or more user interface elements, and/or performing functionality associated with a set of user interface elements. Further, a semantic action need not be limited to adapting behavior of the device one which the semantic association is generated. For example, the semantic action may include providing an indication of the action to another device.

In examples, operation 412 may include generating one or more rules instead of or in addition to generating the semantic association. For example, rules associated with the set of user signals and the environmental context may be generated, such that the presence of such conditions results in performance of an associated semantic action. As another example, annotated training data may be generated based on the user signals, environmental context, and associated user action, such that a machine learning model may be trained or retrained to identify future scenarios in which the semantic action should be performed. In some instances, a user may view, edit, remove, or add semantic associations generated according to aspects described herein. For example, the user may associate a set of user signals with an additional or alternative semantic action, may add or remove user signals of a semantic association, and/or may specify additional or alternative environmental contexts, among other examples. Thus, it will be appreciated that any of a variety of techniques may be used to generate an association between a set of user signals and an action for a given environmental context according to aspects described herein. Method 400 terminates at operation 412.

Figure 5:
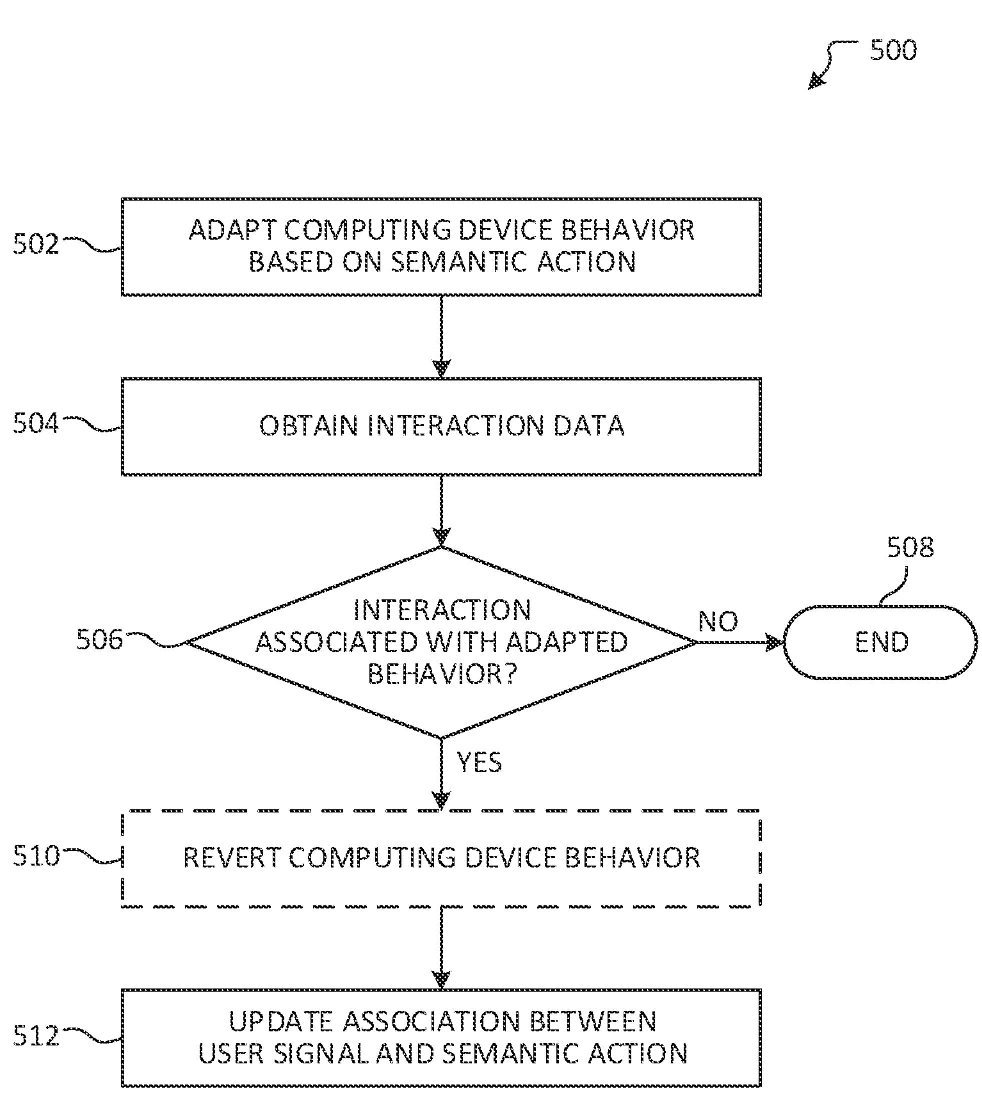
FIG. 5 illustrates an overview of an example method for updating an association between a set of user signals and an action according to aspects described herein.

FIG. 5 illustrates an overview of an example method 500 for updating an association between a set of user signals and an action according to aspects described herein. In examples, aspects of method 500 are performed by a semantic action generator, such as semantic action generator 122 discussed above with respect to FIG. 1. For example, method 500 may be performed by a computing device (e.g., computing device 103 or 104), a peripheral device (e.g., peripheral device 106 or 108), or any of a variety of other devices.

Method 500 begins at operation 502, where the behavior of a computing device is adapted based on a semantic action. For example, operation 502 may include performing aspects of method 200 and/or 300 discussed above with respect to FIGS. 2 and 3, respectively. Thus, aspects of method 500 may be performed after adapting the behavior of a computing device according to aspects described herein.

At operation 504, interaction data is obtained. For example, the interaction data may be obtained from the computing device at which the behavior was adapted and/or one or more other devices. As described above, the interaction data may be associated with hardware inputs, software inputs, and/or from one or more sensors of a sensor array, among other examples.

At determination 506, it is determined whether the interaction data is indicative of a user interaction associated with the adapted computing device behavior that resulted from operation 502. For example, the interaction data may be processed according to any of a variety of techniques, including, but not limited to, using a set of rules, a machine learning model, and/or according to computer vision techniques. In examples, determination 506 is determined based on identifying any of a variety of behaviors, including, but not limited to, a look of surprise or a user manually undoing or altering the behavior of the computing device as a result of the adapted behavior.

In examples, the signals evaluated by determination 506 may be user-specific, for example as may be determined based on an association between the user signals and a user manually altering the behavior of the computing device. For instance, it may be determined that a user exhibits a specific set of signals before or contemporaneously with providing user input associated with the resulting computing behavior as a result of performing aspects of operation 502.

If it is not determined that the interaction data includes a set of user signals associated with the adapted computing behavior, flow branches "NO" and terminates at operation 508. However, if it is determined that the interaction data includes a set of user signals that is associated with the adapted computing behavior, flow instead branches "YES" to operation 510, where the computing device behavior may be reverted. For example, operation 510 may comprise reverting, undoing, or otherwise reversing at least a part of the semantic action that was performed at operation 502.

Operation 510 is illustrated as using a dashed line to indicate that, in other examples, operation 510 may be omitted. For example, it may be determined that the interaction data indicates that the user has already reverted the behavior of the computing device, such that operation 510 need not be performed. As another example, it may be determined that a subset of a set of semantic actions has been reverted by the user, such that a remaining subset of semantic actions is reverted at operation 510.

At operation 512, a semantic association between a user signal and the semantic action that was performed at operation 502 may be updated. For example, updating the semantic association may include deleting the semantic association, modifying a semantic action associated with the semantic association (e.g., based on one or more manual actions that were performed by the user), or updating a set of signals of the semantic association (e.g., as may be the case when a different set of user signals should be used to trigger the semantic action). As another example, annotated training data may be generated or updated based on the user signals, an associated environmental context, and/or an action performed by the user, such that a machine learning model may be trained or retrained to identify future scenarios in which the semantic action should be performed. Thus, it will be appreciated that any of a variety of updates may be made to a semantic association according to aspects described herein. Method 500 terminates at operation 512.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
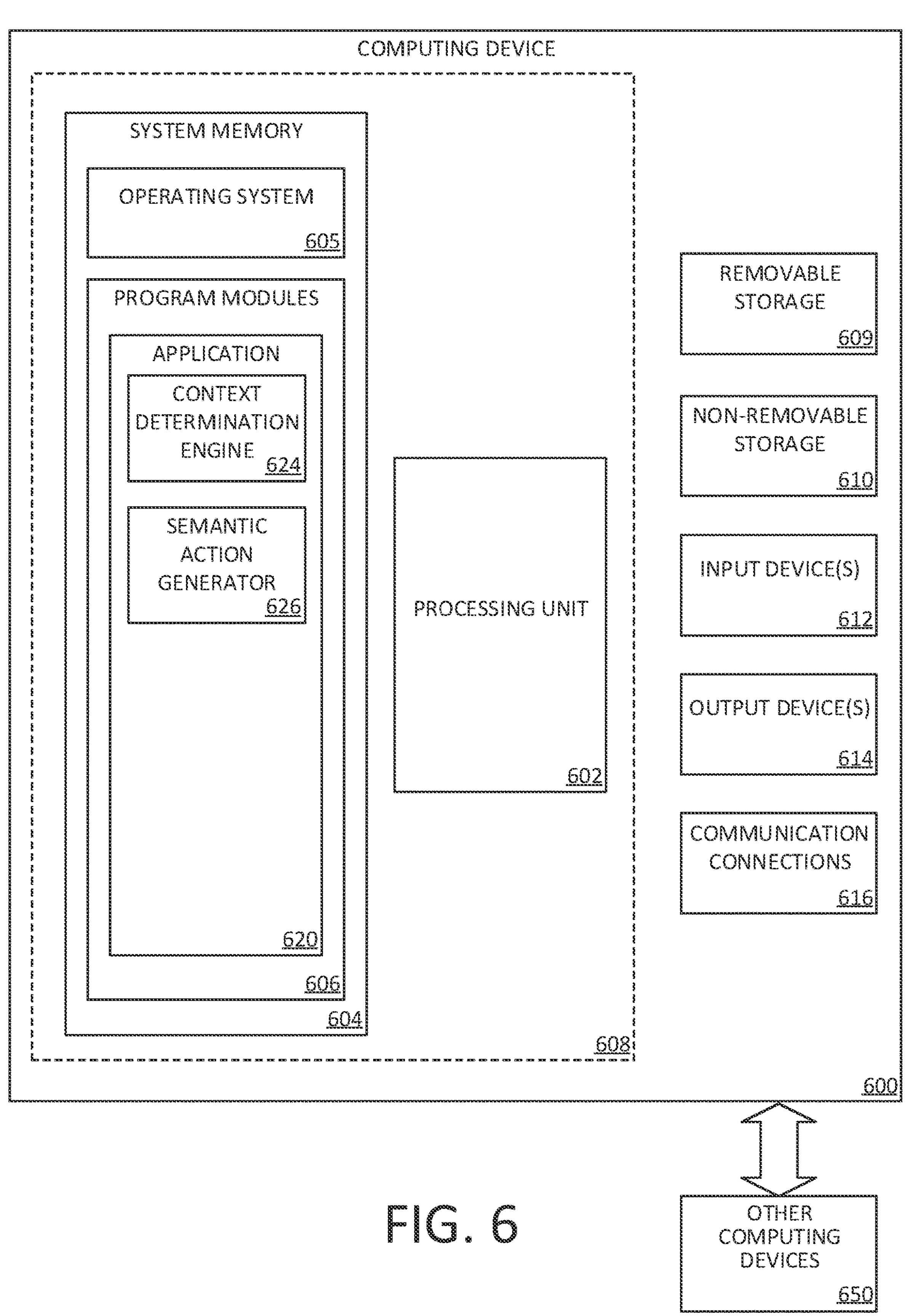
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices described above, including devices 102, 103, 104, 106, and/or 108 in FIG. 1. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store context determination engine 624 and semantic action generator 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
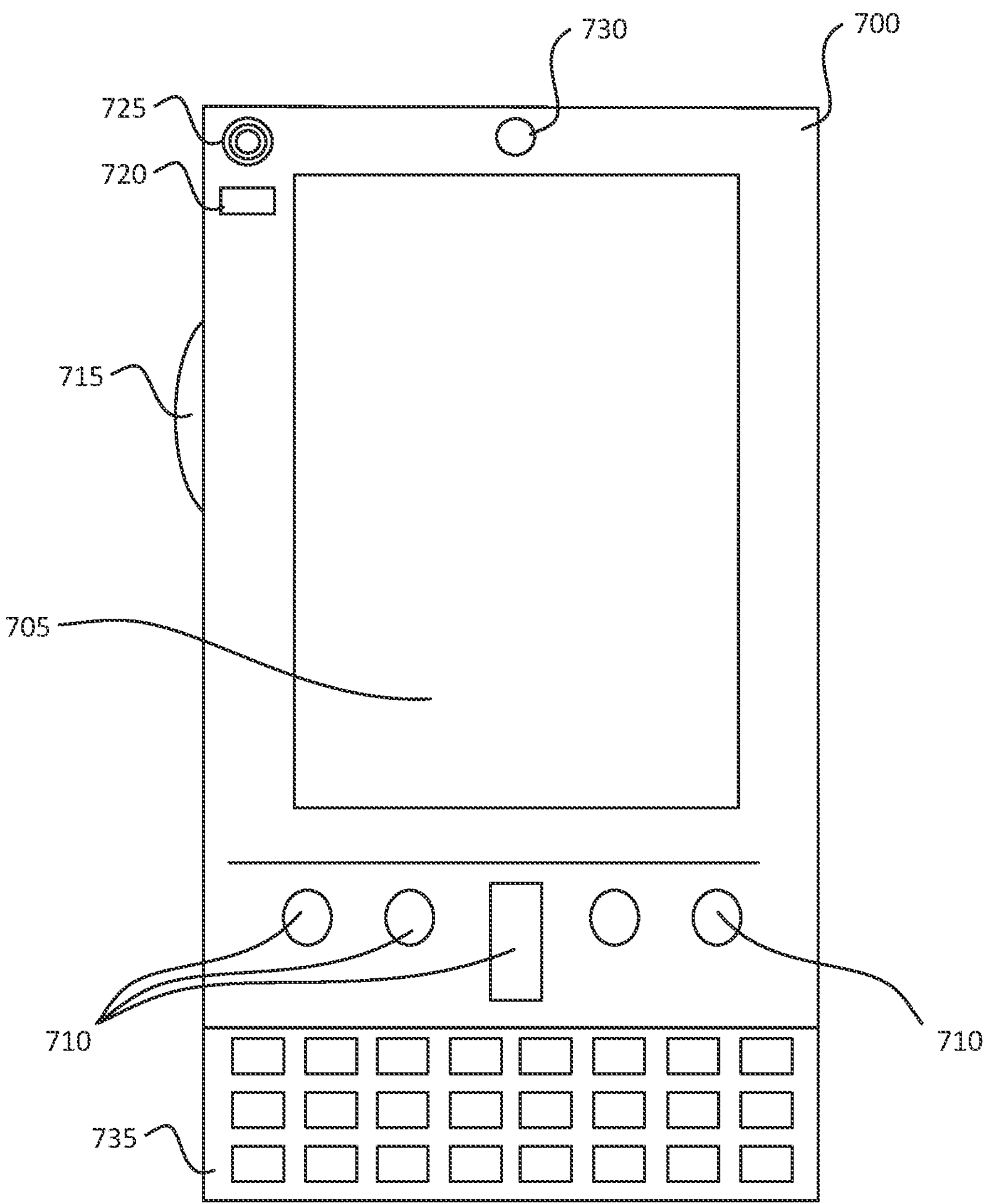
FIGS. 7A and 7B are simplified block diagrams of a mobile computing device with which aspects of the present disclosure may be practiced.
Figure 7B:
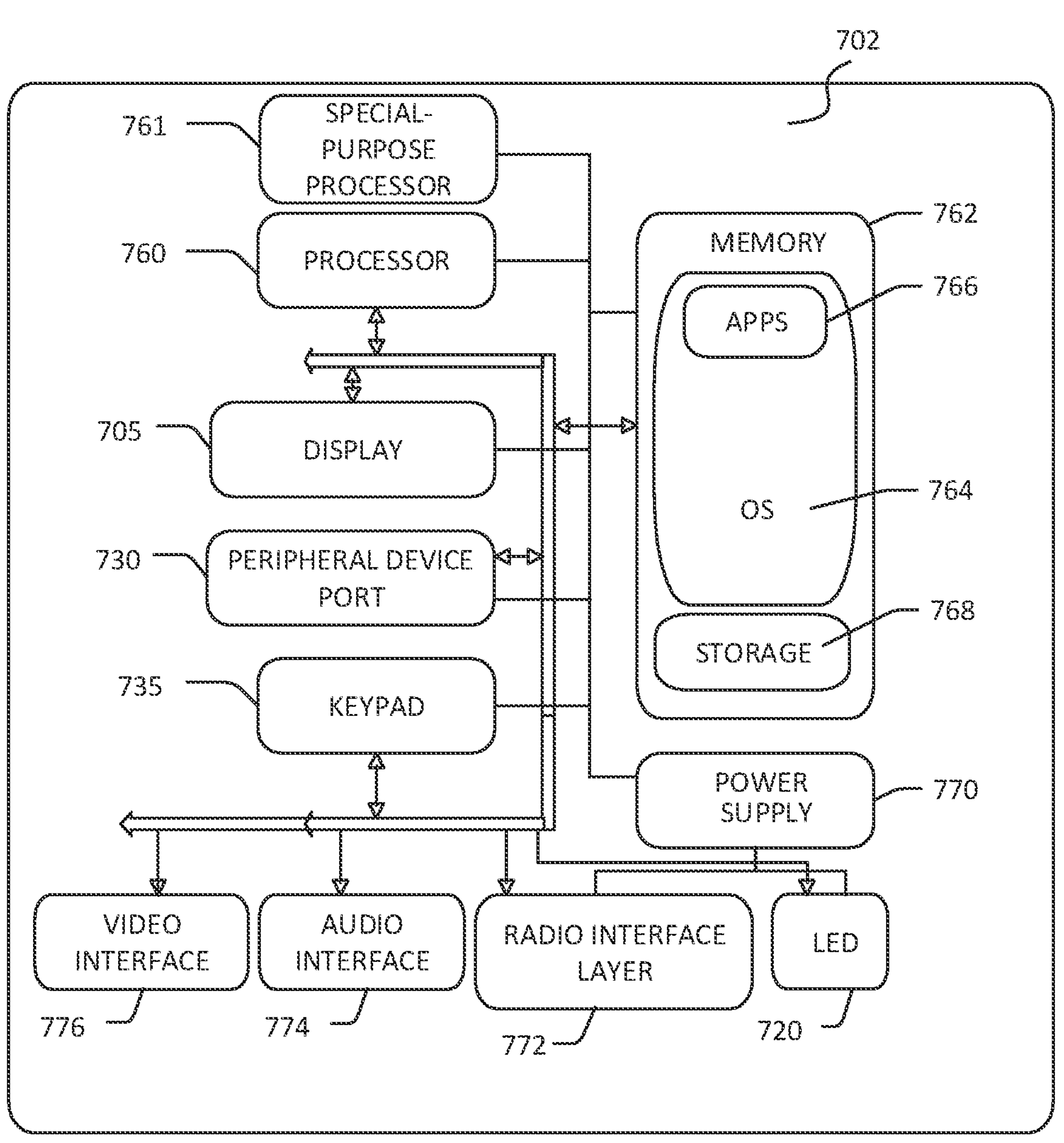

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., a signal identification engine, a context determination engine, a semantic action generator, etc.).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
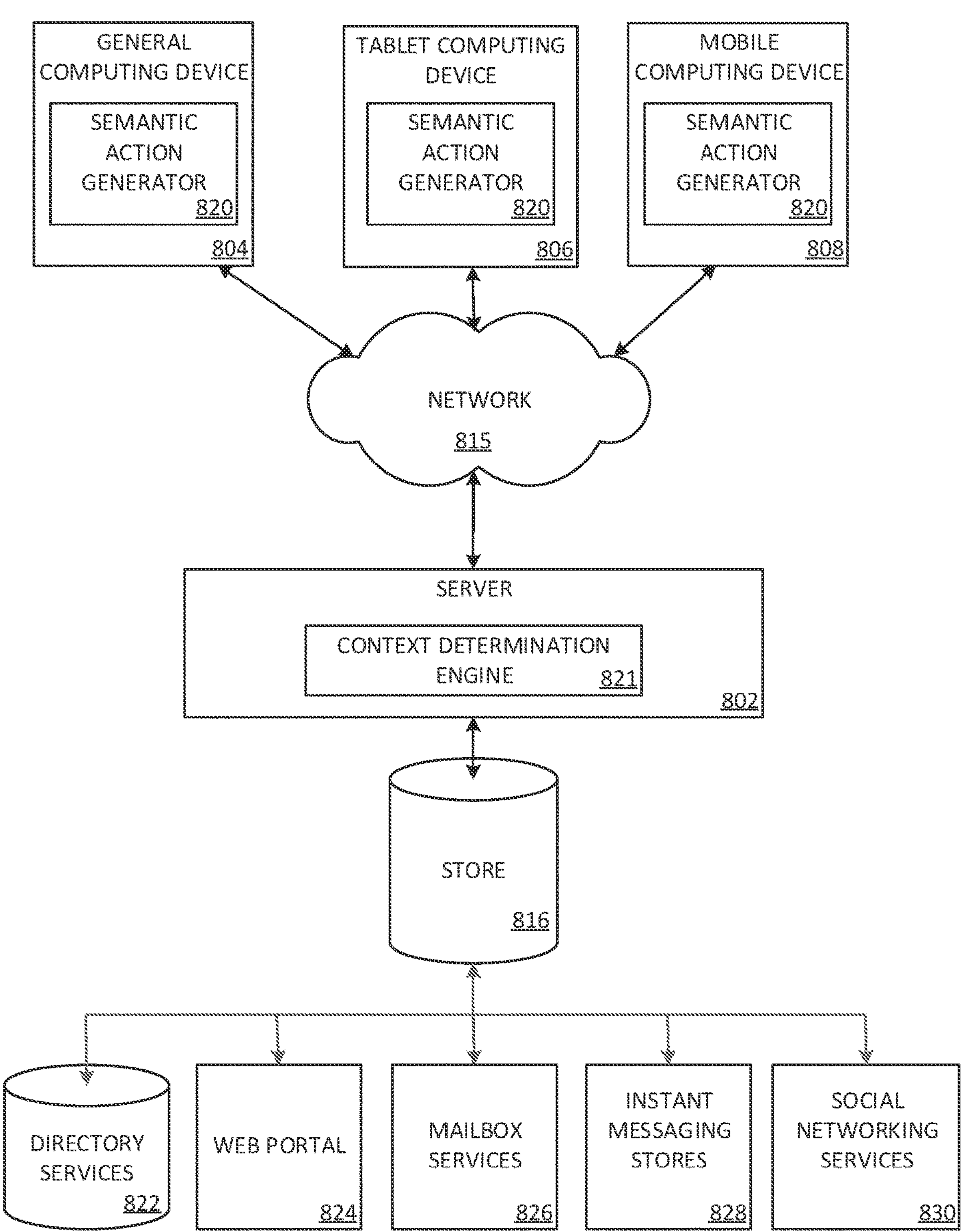
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

A semantic action generator 820 may be employed by a client that communicates with server device 802, and/or context determination engine 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
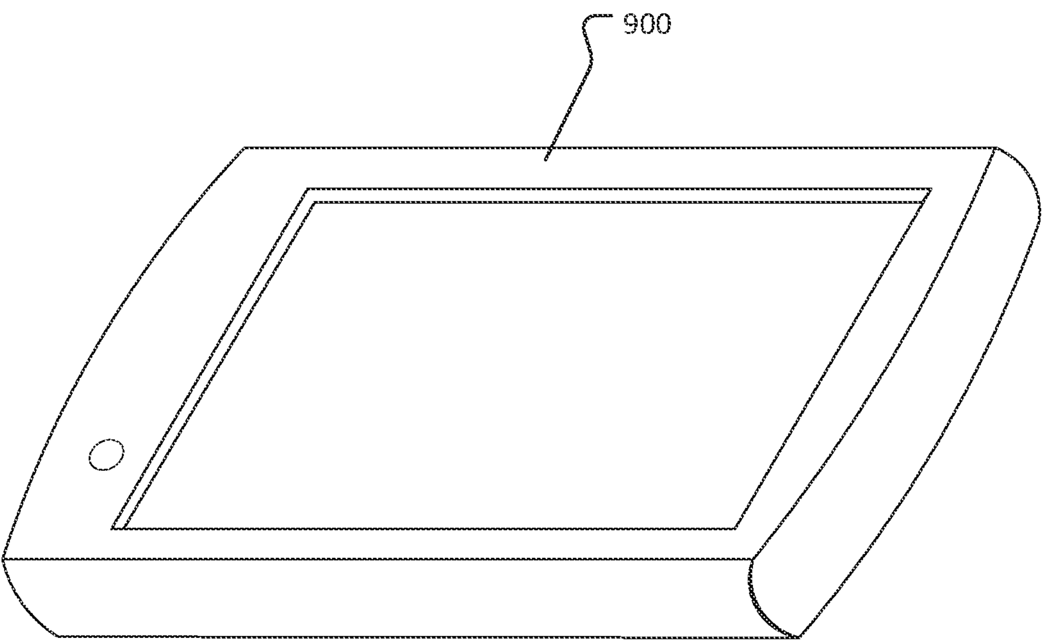
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: obtaining interaction data associated with a user of a computing device; processing the interaction data to generate a set of user signals; determining, based on an environmental context, a semantic action associated with the set of user signals, wherein the environmental context includes a computing device orientation; and performing the determined semantic action, thereby adapting the computing device responsive to the interaction data based on the digital context and the physical context. In an example, the semantic action is determined based on the set of user signals as a result of a semantic association between the semantic action, the set of user signals, and the environmental context. In another example, the semantic action is determined based on the set of user signals using a machine learning model trained according to training data that includes a user-performed action and associated interaction data. In a further example, the interaction data comprises at least one of: explicit user input to the computing device; or implicit user input from a sensor array of the computing device. In yet another example, the set of user signals is a first set of user signals; the environmental context is a first environmental context; the semantic action is a first semantic action; and the set of operations further comprises: identifying a second set of user signals; determining, based on a second environmental context, a second semantic action associated with the second set of user signals, wherein the second environmental context is different than the first environmental context; and performing the determined second semantic action. In a further still example, the second semantic action adapts another computing device associated with the computing device orientation. In another example, the environmental context comprises at least one of: a set of open applications of the computing device; an active user account of the computing device; an active application of the computing device; or an active application window of the computing device. In a further example, the determined semantic action comprises at least one of: providing, via an application programming interface, an indication of the determined semantic action to an application of the computing device; muting a microphone of the computing device; performing an action based on a gaze of the user; or performing a first action that is different from a second action, wherein the second action is associated with the set of user signals and a different environmental context.

In another aspect, the technology relates to a method for processing semantic user input to controlling a computing device. The method comprises: identifying a set of user signals in association with an first environmental context; determining, based on the first environmental context, a first semantic action associated with the set of user signals; identifying the set of user signals in association with a second environmental context; determining, based on the second environmental context, a second semantic action associated with the set of user signals, wherein the second environmental context is different than the first environmental context; and performing the second semantic action to control the computing device. In an example, the computing device is a first computing device; the first environmental context indicates an association with a second computing device; the second environmental context indicates an association with the first computing device; and the method further comprises performing the first semantic action to control the second computing device. In another example, the first semantic action is different than the second semantic action. In a further example, the first semantic action is a default action associated with the set of user signals.

In a further aspect, the technology relates to a method for processing semantic user input to control a computing device. The method comprises: obtaining interaction data associated with a user of a computing device; processing the interaction data to generate a set of user signals; determining, based on an environmental context, a semantic action associated with the set of user signals, wherein the environmental context includes a computing device orientation; and performing the determined semantic action, thereby adapting the computing device responsive to the interaction data based on the digital context and the physical context. In an example, the semantic action is determined based on the set of user signals as a result of a semantic association between the semantic action, the set of user signals, and the environmental context. In another example, the semantic action is determined based on the set of user signals using a machine learning model trained according to training data that includes a user-performed action and associated interaction data. In a further example, the interaction data comprises at least one of: explicit user input to the computing device; or implicit user input from a sensor array of the computing device. In a further example, the set of user signals is a first set of user signals; the environmental context is a first environmental context; the semantic action is a first semantic action; and the method further comprises: identifying a second set of user signals; determining, based on a second environmental context, a second semantic action associated with the second set of user signals, wherein the second environmental context is different than the first environmental context; and performing the determined second semantic action. In yet another example, the second semantic action adapts another computing device associated with the computing device orientation. In a further still example, the environmental context comprises at least one of: a set of open applications of the computing device; an active user account of the computing device; an active application of the computing device; or an active application window of the computing device. In another example, the determined semantic action comprises at least one of: providing, via an application programming interface, an indication of the determined semantic action to an application of the computing device; muting a microphone of the computing device; performing an action based on a gaze of the user; or performing a first action that is different from a second action, wherein the second action is associated with the set of user signals and a different environmental context.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:

at least one processor; and memory storing instructions that, when executed by the at least one processor, causes the system to perform a set of operations, the set of operations comprising:

obtaining a first instance of interaction data associated with a user of a computing device;

processing the first instance of interaction data to generate a first set of user signals;

determining, based on a first environmental context, a first semantic action associated with the first set of user signals, wherein the first environmental context includes a computing device orientation of the computing device relative to a first computing device;

performing the determined first semantic action, thereby adapting the computing device responsive to the first instance of interaction data based on the first environmental context;

obtaining a second instance of interaction data associated with the user;

processing the second instance of interaction data to generate a second set of user signals, wherein the second set of user signals is similar to the first set of user signals;

determining, based on a second environmental context, a second semantic action, wherein the second semantic action is of a different semantic type than the first semantic action, the different semantic type corresponding to a different computing-device function or application-level operation, and the second environmental context includes a computing device orientation of the computing device relative to a second computing device different than the first computing device; and performing the determined second semantic action, thereby adapting the computing device differently than the first semantic action based on the similar second set of user signals and the different relative computing device orientation of the second environmental context.

2. The system of claim 1, wherein the first semantic action is determined based on the first set of user signals as a result of a semantic association between the first semantic action, the first set of user signals, and the first environmental context.

3. The system of claim 1, wherein the first semantic action is determined based on the first set of user signals using a machine learning model trained according to training data that includes a user-performed action and associated interaction data.

4. The system of claim 1, wherein the first instance of interaction data comprises at least one of:

explicit user input to the computing device; or implicit user input from a sensor array of the computing device.

5. The system of claim 1, wherein the first environmental context comprises at least one of:

a set of open applications of the computing device;

an active user account of the computing device;

an active application of the computing device; or an active application window of the computing device.

6. The system of claim 1, wherein the determined first semantic action comprises:

providing, via an application programming interface, an indication of the determined first semantic action to an application of the computing device, causing the computing device to remotely control the first computing device to perform a first operation, and the determined second semantic action comprises providing, through the application programming interface, an indication of the determined second semantic action to the application of the computing device, causing the computing device to remotely control the second computing device to perform a second operation that is distinct from the first operation.

7. The system of claim 1, wherein the first semantic action is a default action associated with the first set of user signals.

8. The system of claim 1, wherein the first environmental context further comprises the user's gaze toward a first direction, the first semantic action is based on the first direction, the second environmental context further comprises the user's gaze toward a second direction, the first direction is distinct from the second direction, and the second semantic action is based on the second direction.

9. A method for processing semantic user input to controlling a computing device, the method comprising:

identifying a first set of user signals in association with a first environmental context, wherein the first environmental context includes an orientation of the computing device relative to another computing device;

determining, based on the first environmental context, a first semantic action associated with the first set of user signals;

identifying a second set of user signals in association with a second environmental context, wherein the second set of user signals is similar to the first set of user signals;

determining, based on the second environmental context, a second semantic action associated with the second set of user signals, wherein the second environmental context is different than the first environmental context, the second environmental context includes a computing device orientation of the computing device relative to said another computing device different than the computing device, and the second semantic action is of a different semantic type than the first semantic action, the different semantic type corresponding to a different computing-device function or application-level operation; and performing the second semantic action to control the computing device, thereby adapting the computing device differently than the first semantic action based on the second set of user signals that is similar to the first set of user signals and the different relative computing device orientation of the second environmental context.

10. The method of claim 9, wherein:

the computing device is a first computing device;

the first environmental context indicates an association with a second computing device;

the second environmental context indicates an association with the first computing device; and the method further comprises performing the first semantic action to control the second computing device.

11. The method of claim 9, wherein the first environmental context includes a different physical context than the second environmental context.

12. The method of claim 9, wherein the first semantic action is a default action associated with the first set of user signals.

13. The method of claim 9, wherein the first environmental context indicates a different computing device orientation of the computing device relative to a second computing device than the second environmental context.

14. The method of claim 9, wherein the first semantic action is determined based on the first set of user signals using a machine learning model trained according to training data that includes a user-performed action and associated interaction data.

15. A method for processing semantic user input to control a computing device, the method comprising:

obtaining a first instance of interaction data associated with a user of a computing device;

processing the first instance of interaction data to generate a first set of user signals;

determining, based on a first environmental context, a first semantic action associated with the first set of user signals, wherein the first environmental context includes a computing device orientation of the computing device relative to a first computing device;

performing the determined first semantic action, thereby adapting the computing device responsive to the first instance of interaction data based on the first environmental context;

obtaining a second instance of interaction data associated with the user;

processing the second instance of interaction data to generate a second set of user signals, wherein the second set of user signals is similar to the first set of user signals;

determining, based on a second environmental context, a second semantic action, wherein the second semantic action is of a different semantic type than the first semantic action, the different semantic type corresponding to a different computing-device function or application-level operation, and the second environmental context includes a computing device orientation of the computing device relative to a second computing device different than the first computing device; and performing the determined second semantic action, thereby adapting the computing device differently than the first semantic action based on the similar second set of user signals and the different relative computing device orientation of the second environmental context.

16. The method of claim 15, wherein the first semantic action is determined based on the first set of user signals as a result of a semantic association between the first semantic action, the first set of user signals, and the first environmental context.

17. The method of claim 15, wherein the first semantic action is determined based on the first set of user signals using a machine learning model trained according to training data that includes a user-performed action and associated interaction data.

18. The method of claim 15, wherein the first instance of interaction data comprises at least one of:

explicit user input to the computing device; or implicit user input from a sensor array of the computing device.

19. The method of claim 15, wherein the first environmental context comprises at least one of:

a set of open applications of the computing device;

an active user account of the computing device;

an active application of the computing device; or an active application window of the computing device.

20. The method of claim 15, wherein the determined semantic action comprises:

providing, via an application programming interface, an indication of the determined first semantic action to an application of the computing device, causing the computing device to remotely control the first computing device to perform a first operation, and the determined second semantic action comprises providing, through the application programming interface, an indication of the determined second semantic action to the application of the computing device, causing the computing device to remotely control the second computing device to perform a second operation that is distinct from the first operation.

* * * * *